Aug. 23, 1938.  M. P. HOLMES  2,127,517
TRANSMISSION MECHANISM
Original Filed Aug. 5, 1931
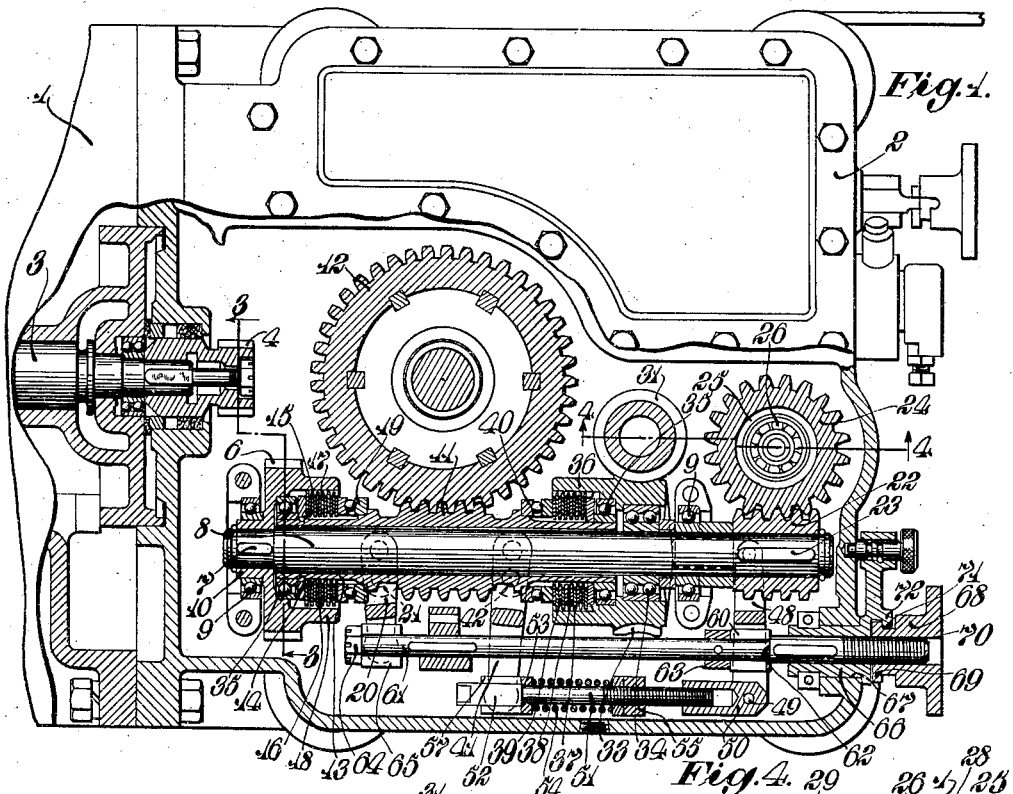
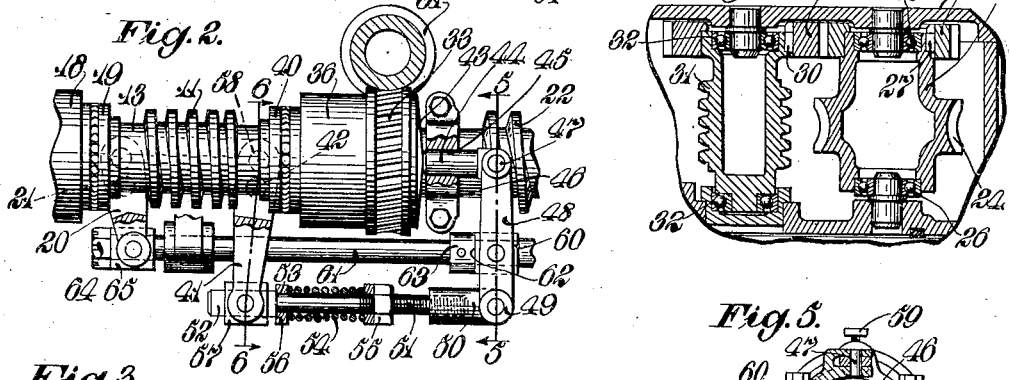
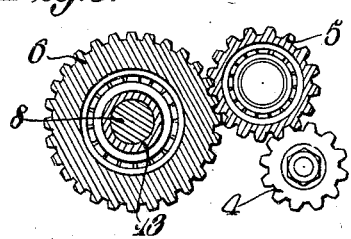
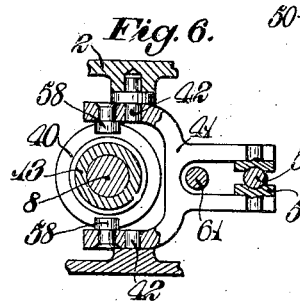
Inventor:
Morris P. Holmes.
by
Luis A. Maxson
Atty.

Patented Aug. 23, 1938

2,127,517

UNITED STATES PATENT OFFICE 2,127,517

TRANSMISSION MECHANISM

Morris P. Holmes, Claremont, N. H., assignor to Sullivan Machinery Company, a corporation of Massachusetts Original application August 5, 1931, Serial No. 555,328. Divided and this application February 27, 1933, Serial No. 658,805

13 Claims. (Cl. 74—125.5)

This invention relates to transmission mechanisms, and more particularly to improvements in transmission mechanisms having embodied therein means for effecting drive at variable intermittent and continuous low speeds and at a predetermined higher speed.

An object of this invention is to provide an improved transmission mechanism. Another object is to provide an improved variable speed transmission mechanism having an improved speed varying means. A further object is to provide an improved transmission mechanism having embodied therein improved means for effecting drive at variable intermittent or continuous low speeds and at a predetermined higher speed. Still another object is to provide, in a transmission mechanism of the above character, improved speed varying means including a power transmission clutch and improved means for automatically loading said clutch at predetermined time intervals, the clutch loading means driven from an element of the transmission drive. Yet another object is to provide in such a transmission mechanism improved means for varying the time intervals of loading of the clutch. Still another object is to provide in such a transmission mechanism a friction power transmission clutch, loading means for said clutch including a yielding connection, and means for intermittently or continuously tensioning said yielding connection to an extent sufficient to effect drive of the driven element. A further object is to provide improved means for variably tensioning aforesaid yielding connection including a cam, a lever arranged for actuation by said cam and operatively connected to said yielding connection, and means for shifting the fulcrum of said lever to vary the range of actuation thereof, thereby variably to load said clutch to effect intermittent drive therethrough at variable speeds. These and other objects and advantages of the invention will, however, hereinafter more fully appear.

In the accompanying drawing there is shown for purposes of illustration one form which the invention may assume in practice.

In this drawing—

Fig. 1 is a horizontal sectional view of the illustrative embodiment of the improved transmission mechanism.

Fig. 2 is a plan view, with parts shown in horizontal section, illustrating certain details of the mechanism shown in Fig. 1.

Fig. 3 is a detail sectional view taken substantially on line 3—3 of Fig. 1.

Fig. 4 is a longitudinal sectional view taken substantially on line 4—4 of Fig. 1.

Fig. 5 is a transverse vertical sectional view taken on line 5—5 of Fig. 2.

Fig. 6 is a transverse vertical sectional view taken substantially on line 6—6 of Fig. 2.

In this illustrative embodiment of the invention, which is a division of my copending application Serial No. 555,328, filed August 5, 1931, now matured into Patent No. 1,968,769, granted July 31, 1934, there is shown a casing 1 housing a motor, and a casing 2 housing the improved transmission mechanism. The motor within the casing 1 is herein preferably of the reversible electric type having its power shaft 3 horizontally disposed and longitudinally extending. Fixed to the motor power shaft is a spur pinion 4 meshing, as shown in Fig. 3 with an elongated gear 5 suitably journaled within the casing 2 and in turn meshing with and driving a spur gear 6 keyed at 7 to a transmission shaft 8. In this construction, the shaft 8 is horizontally disposed and is arranged with its axis parallel with the motor shaft axis, as shown in Fig. 1, and is journaled in bearings 9, 9 carried by the casing 2 and arranged respectively at the rearward end of the shaft and adjacent the front end of the latter, the rearward bearing cooperating with a hub 10 integral with the gear 6. Arranged coaxially with and surrounding the shaft 8 is a worm 11 whose driving connections, which provide for the worm rotation at a predetermined relatively high speed and at a predetermined relatively low speed and intermittent rotation at a number of still lower mean rates, will be shortly hereinafter described. The worm 11 meshes with and drives a worm wheel 12 which constitutes the final driven element of the transmission mechanism.

Fast speed rotation of the worm 11 is effected herein by direct connection of the worm with the gear 6, the rearward end of a tubular shaft 13 on which the worm 11 is formed having formed thereon a series of grooves 14 which cooperate with the discs 15 of a friction clutch 16. The other discs 17 of the friction clutch are connected in non-rotative relation to the gear element 6, and are housed within a sleeve portion 18 of the latter. A ball bearing clutch applying element 19 is operative to transmit the pressure of a clutch shipper element 20, which is pivotally supported at 21 on the casing 2, to effect loading of the friction clutch 16 and thereby to effect connection between the fast speed gear 6 and the worm 11.

Continuous rotation of the worm 11 at a slow speed and intermittent rotation at a number of different still slower mean speeds is effected herein by the following mechanism. The front end of the shaft 8 carries a worm 22 keyed thereto at 23 and meshing with a worm wheel 24 having a hollow vertical shaft 25 journaled at 26, 26 in the casing 2, as shown in Fig. 4. The upper end of the shaft 25 has keyed thereto at 27 a driving pinion 28 which meshes with a gear 29 keyed at 30 to the upper end of a worm 31 supported at 32, 32 in the casing 2. The worm 31, which rotates on a vertical axis parallel to the axis of the worm wheel 24, engages and drives a worm wheel 33 rotatably supported by a ball bearing 34 upon the shaft 8 near the bearing 9, as shown in Fig. 1. The tubular shaft 13 on which the worm 11 is formed is journaled at its ends within bearings 35, 35 carried within the gears 6 and 33, respectively. The worm wheel 33 has a sleeve portion 36 to which discs 37 of a friction clutch 38 are connected in non-rotative relation. The other discs 39 of this clutch are secured in non-rotative relation to the tubular shaft 13 at the forward end of the latter. A ball bearing clutch applying element 40 is movable by a pivoted clutch shipper 41 to apply pressure to the discs of the friction clutch 38 to effect drive of the worm 11 by the slow speed worm wheel 33. The shipper 41 is pivotally supported at 42 on the casing 2.

At its forward end the worm wheel 33 is provided with a cam surface 43 (see Fig. 2) which is adapted to cooperate with a hardened pin or plunger 44 slidably supported in a bore 45 in a cap member 46 which positions the right hand bearing 9. At its forward end the pin 44 is pivotally connected at 47 with one end of a lever 48, whose opposite end 49 is pivotally connected to a threaded member 50 which receives the forward end of a threaded rod 51. The rearward end of the rod 51 is provided with an enlargement 52 forming a shoulder 53, and a spring 54 is compressed between a nut 55 cooperating with the threaded forward end of the rod 51 and a collar 56 slidably mounted upon the rod 51 adjacent the rearward end of the latter and normally engaging the shoulder 53. The enlarged rearward end 52 of the rod 51 passes through a trunnion device 57 supported by the shipper member 41 which carries, at its opposite side from its pivot 42, clutch applying elements 58 engageable with the clutch applying element 40. It will be evident from the foregoing description that movement to the left of the rod 51 in Figs. 1 and 2 will result in the transmission of no pressure to the clutch shipper member 41 until the sliding collar 56 engages the end of the trunnion device 57; but that further movement to the left, in these figures, of the rod 51 will thereafter impart a load to the shipper member 41 which will be determined by the extent of the movement of the rod and the degree of compression of the spring 54. The pin 44 may be held against sliding movement in the bore 45 when desired, by means of any suitable device, such as, herein, a set screw 59 threadedly supported in the top of the cap member 46. A movable fulcrum for the lever 48 is provided by a trunnion device 60 which is held upon a longitudinally movable rod 61 between a shoulder 62 on the latter and a collar 63 pinned to the latter. The rearward end of the longitudinally movable rod 61 carries a nut 64 which, on forward movement of the rod, applies pressure to a trunnion device 65 surrounding the rod 61 and pivotally mounted in the outer end of the shipper member 20. The rod 61 extends through a sleeve 66 which is secured in a bore 67 in the end wall of the casing 2 so as to preclude longitudinal movement thereof in the bore. The rod itself is slidable within the sleeve and longitudinal sliding movement of the rod is effected by means of a nut member 68 provided with a grasping portion 69 and threadedly connected at 70 with the forward end of the rod 61. A groove 71 cooperates with a lip 72 carried by the sleeve 66 to hold the nut member 68 against longitudinal member relative to the sleeve while permitting rotation thereof relative thereto in opposite directions. Rotation of the nut member in a direction to cause movement of the rod 61 toward the right in Figs. 1 and 2 results in loading of the friction clutch 16 and driving of the worm 11 directly by the high speed gear 6. Rotation of the nut 68 in a direction to effect movement of the rod 61 toward the left in Figs. 1 and 2 moves the fulcrum 60 of the lever 48 toward the left, and thereby moves the pin 44 into engagement with the cam 54; and upon movement of the fulcrum sufficiently far to the left, the other end of the lever 48 will have sufficient throw so that the shoulder 53 will pass inside the trunnion device 57 and permit the collar 56 to contact with the trunnion device, and the spring 54 to load the friction clutch 38. Obviously, when the spring 54 is under sufficient compression so that it will yield only when a pressure adequate to effect power transmission through the discs of the friction clutch 38 is applied to the collar 63, the adjustment of the fulcrum device 62 may effect rotation of the worm 11 at a slow speed by the slow speed worm wheel 33 for any desired part of each revolution of the latter. When the rod 61 is moved to the left so far that the collar 56 continuously presses, under the pressure of the spring, against the fulcrum device 57, continuous rotation of the worm 11 will take place and the spring 54 will compress during each rotation of the worm wheel 33 an amount substantially equal to the full throw of the cam 43; but since the load of the spring is desirably above the minimum necessary to effect power transmission through the friction clutch discs, there will be no release even when the lowest point in the cam 43 is opposite the pin 44. However, by moving the rod 61 a graduated amount toward the right in Figs. 1 and 2, the period of drive during each rotation of the worm wheel 33 may be progressively reduced until it is entirely disconnected.

Obviously, if the set screw 59 is used to lock the pin 44 in the position where it is not engaged by the cam 43 at all, there will be no variation in the speed transmitted, but there will be a definitely limited pressure applied through the spring 54 to the friction clutch 38, and a predetermined slow speed drive adapted to slip on overloading will be available. Obviously, if desired, the cam 43, pins 44, etc. may be omitted and a fixed fulcrum provided at the point 47 and a solid, unyielding connection instead of a yielding connection through the spring 54 substituted so as to permit any desired loading of the low speed friction.

From the foregoing description, the mode of operation of this mechanism will be clearly apparent, and therefore a detailed re-description of the mode of operation would be a needless repetition. The driven element of the improved transmission may be rotated at any desired speed from its maximum low speed down to zero, by proper adjustment of the fulcrum 60, and the same may be driven under complete control of the operator through manipulation of the hand rotatable nut 68. Overloading will be prevented, in the illustrative embodiment shown in the drawing, by the presence of the spring 54.

As a result of this invention, it will be noted that an improved transmission mechanism is provided which is of a rugged and compact character, particularly adapted for the purposes intended wherein at times substantial variations in the driving speed are of importance. It will further be noted that by arranging the fast and slow speed drive trains in the manner disclosed, a very convenient and simple operating mechanism for the speed controlling clutches used in the control of the drive of the driven member is made possible. It will still further be noted that a continuous slow speed drive and an intermittent slow speed drive are both available by the same mechanism, permitting a single mechanism with either type of drive if there is any choice under peculiar circumstances. Further advantages will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a transmission mechanism, a driving element, a driven element, and driving connections between said elements including a friction clutch, loading means for said clutch including a flexible connection through which the clutch loading pressure is yieldingly transmitted to effect clutch loading, and means actuated by an element of said driving connections for selectively intermittently or continuously tensioning said flexible clutch loading connection to load said clutch to an extent sufficient to effect selective intermittent or continuous drive of said driven element.

2. In a transmission mechanism, a driving element, a driven element, and driving connections between said elements including a friction clutch, loading means for said clutch including a yielding connection through which the clutch loading pressure is yieldingly transmitted to effect clutch loading, and means for variably tensioning said yielding connection variably to load said clutch to effect variable drive of said driven element including a cam, a lever arranged for actuation by said cam and operatively connected to said yielding clutch loading connection, and means for shifting the fulcrum of said lever to vary the range of actuation thereof, said shifting means including means providing a range of adjustment permitting constant tensioning of said yielding connection.

3. In a transmission mechanism, a driving element, a driven element, and driving connections between said elements including a friction clutch, loading means therefor including a yielding connection and means for variably tensioning said yielding connection including a cam coaxial with said clutch, a lever arranged for actuation by said cam and operatively connected to said yielding connection, and means for shifting the fulcrum of said lever to vary the range of actuation thereof.

4. In a transmission mechanism, a driving element, a coaxial driven element, and driving connections between said elements including a friction clutch coaxial with said elements and including clutch elements fixed as regards rotation relative to said driving and driven elements respectively, loading means for the elements of said clutch including a yielding clutch loading spring connection through which the clutch loading pressure is transmitted to effect clutch loading, and means for selectively intermittently or continuously tensioning said yielding clutch loading connection to load said clutch to an extent sufficient to effect selective intermittent or continuous drive of said driven element.

5. In a transmission mechanism, a driving element, a coaxial driven element, and driving connections between said elements including a frictional transmission device coaxial with said elements and including transmission elements fixed as regards rotation relative to said driving and driven elements respectively, and yieldable means actuated by an element of said driving connections for automatically intermittently yieldingly and variably loading said transmission elements of said frictional device to effect intermittent variable speed rotation of said driven element and for continuously loading said transmission elements to effect substantially uniform continuous rotation of said driven element, said yieldable means including a spring through which variable loading pressures are yieldingly transmitted to said frictional device, and means for varying the loading pressures transmitted through said spring.

6. In a transmission mechanism, a driving element, a driven element, and driving connections between said elements including a frictional transmission device, and means actuated by an element of said driving connections for automatically intermittently loading said frictional device to effect intermittent variable speed rotation of said driven element, said means including a rotatable cam, an element actuated thereby, means for varying the engagement of said latter element with said cam, and yieldable means actuated by said last mentioned element for yieldably imparting variable loading pressures to said frictional device.

7. In a transmission mechanism, a driving element, a driven element, and driving connections between said elements including a driving gear, driving members for said gear coaxial therewith and rotating at different speeds, friction clutches for selectively connecting said driving members with said gear, means for effecting selective loading of said clutches, one of which comprises a yielding load limiting device and means for selectively intermittently or continuously maintaining said device under a clutch-loading load.

8. In a transmission mechanism, a driving element, a driven element, and driving connections between said elements including a gear coaxial with said driven element and connectible thereto to effect drive thereof, and driving means for said gear including a gear coaxial therewith, said driving connections further including means for effecting selectively continuous or intermittent connection between said first mentioned gear and said driven element respectively to an extent sufficient to effect drive of said driven element continuously at a predetermined maximum speed or to effect intermittent drive thereof, said means for effecting intermittent connection including a cam coaxial with said first mentioned gear.

9. In a transmission mechanism, a driving element, a driven element, and driving connections between said elements including a gear coaxial with said driven element and connectible thereto to effect drive thereof, and driving means for said gear including a gear coaxial therewith, and means for effecting selectively intermittent or continuous connection between said first mentioned gear and said driven element to an extent sufficient to effect drive of said driven element, said means for effecting intermittent connection including a cam coaxial with said first mentioned gear and rotating therewith.

10. In a transmission mechanism, a driving element, a driven element, and driving connections between said elements including a high speed gear train, a low speed gear train driven through an element of said high speed gear train, said low speed gear train having a friction controlling clutch through which power is transmitted to effect drive of said driven element at a low speed, means actuated by an element of said low speed gear train for effecting intermittent loading of said friction clutch to an extent sufficient to effect rotation of said driven element intermittently at a low speed, and means operable at will while said transmission mechanism is in motion for rendering said last mentioned means inoperative to effect intermittent rotation, to effect rotation of said driven element at a continuous low speed slightly higher than said intermittent low speed drive.

11. In a transmission mechanism, a driving element, a driven element, and driving connections between said elements including a friction clutch, means for loading the friction clutch by applying different loading pressures to the clutch, and means acting automatically during the operation of the driving connections for intermittently relieving the loading pressure applied to the clutch to provide for variable operation of the driven element, said clutch loading means embodying means for applying a loading pressure such that even when the loading pressure is reduced by said automatically acting means the clutch is held applied to provide for continuous operation of the driven element.

12. In a transmission mechanism, a driving element, a driven element, and driving connections between said elements including a friction clutch, and means for intermittently applying and releasing said clutch to effect intermittent drive of said driven element including a cam driven by said driving element, a pivoted lever actuated by said cam, a rod pivotally connected to said lever and actuated thereby, said rod having an abutment thereon, a pivoted shipper lever, and a spring interposed between said rod abutment and said shipper lever.

13. In a transmission mechanism, a driving element, a driven element, a friction clutch comprising elements fixed as regards relative rotation with respect to said driving and driven elements respectively, and means operative to provide non-slip engagement between said clutch elements during no part of each complete revolution of the clutch element which is fixed relative to the driving element, during a selected fraction of each revolution of such clutch element, or during a complete revolution of such clutch element, selectively at will, including a spring-loaded element, a clutch loading element engageable by the latter and operative when pressed by the latter to effect clutch loading, and means for providing for such engagement throughout any desired portion or the whole of a revolution of such clutch element.

MORRIS P. HOLMES.